United States Patent [19]
Mott

[11] Patent Number: 5,259,820
[45] Date of Patent: Nov. 9, 1993

[54] HYDRAULIC TENSIONER HAVING A VARIABLE ORIFICE CHECK VALVE AND A DOUBLE HELIX INTERNAL RATCHET

[75] Inventor: Philip J. Mott, Dryden, N.Y.

[73] Assignee: Borg-Warner Automotive Transmission & Engine Components Corporation, Sterling Heights, Mich.

[21] Appl. No.: 885,189

[22] Filed: May 19, 1992

[51] Int. Cl.$^5$ .............................................. F16H 7/08
[52] U.S. Cl. .................................................... 474/110
[58] Field of Search ....................... 474/101, 109–111, 474/113, 117, 135, 138

[56] References Cited

U.S. PATENT DOCUMENTS

| | | | |
|---|---|---|---|
| 3,574,418 | 4/1971 | Okabe | 305/10 |
| 3,626,776 | 12/1971 | Staudinger et al. | 74/242.11 S |
| 3,812,733 | 5/1979 | Yoshida | 74/242.11 S |
| 3,896,834 | 7/1975 | Paul, Jr. | 137/625.28 |
| 3,960,026 | 6/1976 | Hibino | 74/242.11 S |
| 3,964,331 | 6/1976 | Oldfield | 74/242.1 FP |
| 4,190,025 | 2/1980 | Wahl | 123/90.31 |
| 4,504,251 | 3/1985 | Mittermeir | 474/110 |
| 4,708,696 | 11/1987 | Kimura et al. | 474/103 |
| 4,713,043 | 12/1987 | Biedermann | 474/111 |
| 4,790,796 | 12/1988 | Okabe et al. | 474/110 |
| 4,826,470 | 5/1989 | Breon et al. | |
| 4,874,352 | 10/1989 | Suzuki | 474/110 |
| 4,902,266 | 2/1990 | Ojima et al. | 474/111 |
| 4,909,777 | 3/1990 | Inoue et al. | 474/110 |
| 4,911,679 | 3/1990 | Inoue et al. | 474/110 |
| 4,940,447 | 7/1990 | Kawashima et al. | 474/110 |
| 4,950,209 | 8/1990 | Kawashima et al. | 474/110 X |
| 4,959,041 | 9/1990 | Ojima et al. | 474/111 |
| 4,963,121 | 10/1990 | Himura et al. | 474/110 |
| 4,985,009 | 1/1991 | Schmidt et al. | 474/110 |
| 4,986,796 | 1/1991 | Kawashima et al. | 474/101 |
| 4,995,854 | 2/1991 | Ojima | 474/111 |
| 5,030,169 | 7/1991 | Kiso et al. | 474/110 |
| 5,116,284 | 5/1992 | Cho | 474/110 |

FOREIGN PATENT DOCUMENTS

| | | |
|---|---|---|
| 1018211 | 1/1966 | United Kingdom . |
| 2065265 | 6/1981 | United Kingdom . |

Primary Examiner—Thuy M. Bui
Attorney, Agent, or Firm—Willian Brinks Olds et al.

[57] ABSTRACT

A hydraulic tensioner having a plunger slidably fitted in a mounting cavity in a housing and biased in a protruding direction by a spring and fluid. A variable orifice check valve permits fluid to only flow into, and thereby protrude the plunger, but not out of the mounting cavity is disclosed. The variable orifice check valve is accomplished with a cylindrical compression spring in which the spring coils are normally mutually contacting, thus preventing the transfer of fluid, but which move to a non-contacting orientation upon experiencing a desired pressure. A mechanical no-return capability is provided to the plunger through an internal ratchet positioned within the mounting cavity and constructed from a cylinder having two helical openings which the plunger engages when the plunger experiences sufficient force to be pushed inwardly.

17 Claims, 3 Drawing Sheets

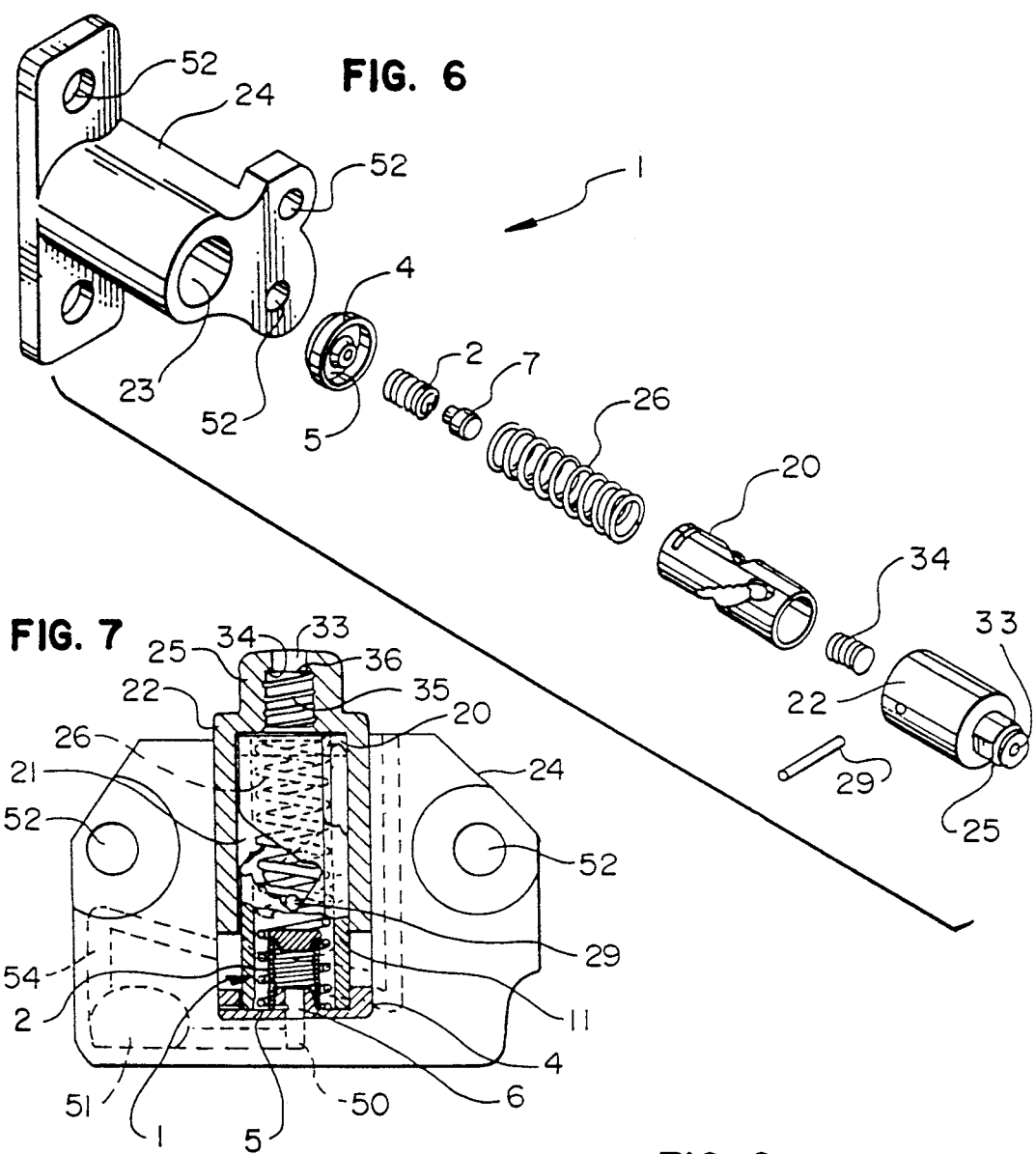

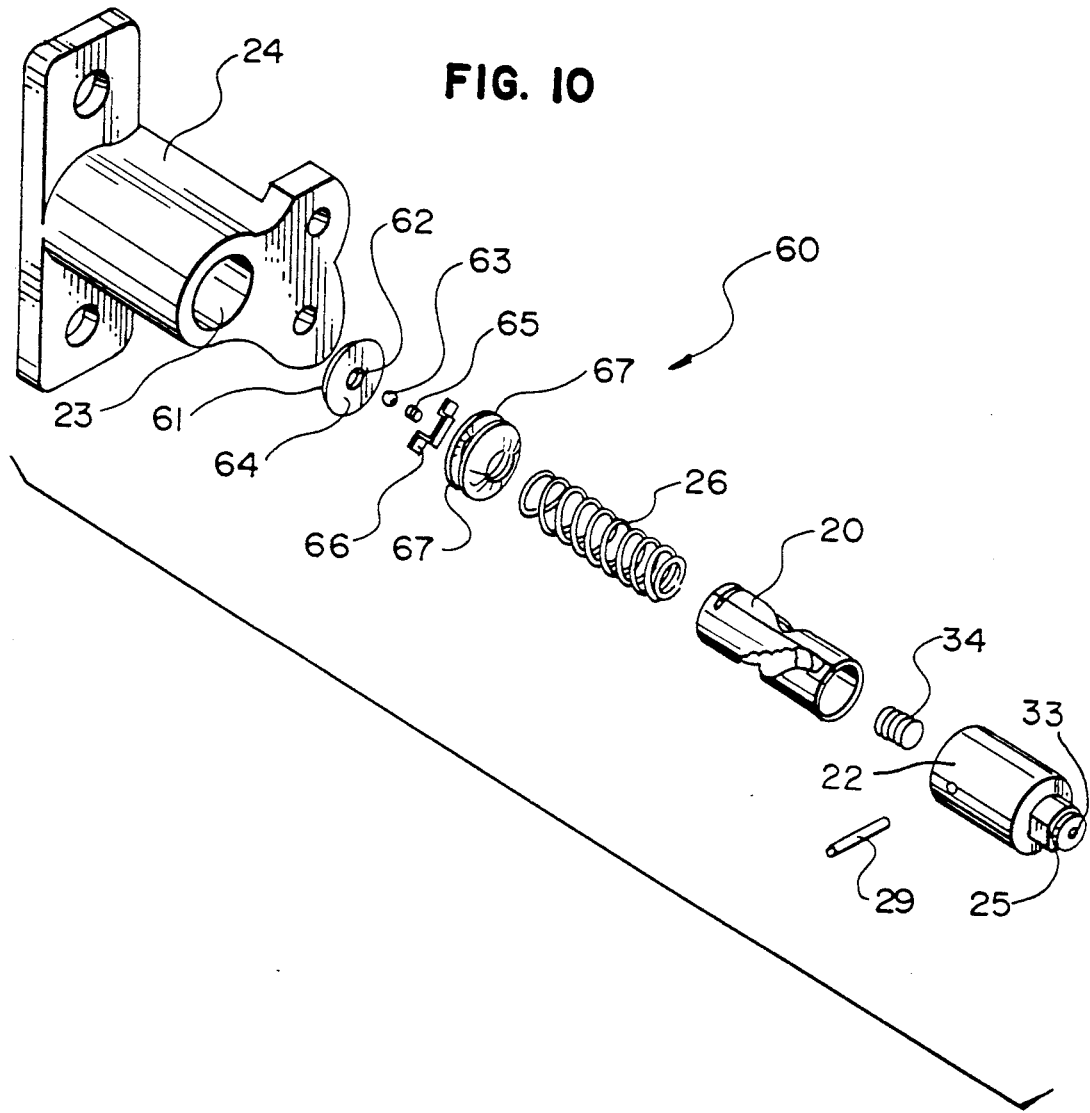

HYDRAULIC TENSIONER HAVING A VARIABLE ORIFICE CHECK VALVE AND A DOUBLE HELIX INTERNAL RATCHET

FIELD OF THE INVENTION

This invention relates to hydraulic tensioners, and more particularly to a hydraulic tensioner having a variable orifice check valve and a double helix internal ratchet which is useful for constantly imparting and maintaining tension to wrapped power transmission devices such as chains, belts and the like.

BACKGROUND OF THE INVENTION

Tensioning devices, such as hydraulic tensioners, are used as a control device for a power transmission chain, or any similar power transmission devices, as the chain travels between a plurality of sprockets. Generally, it is important to impart and maintain a certain degree of tension to the chain to prevent noises, slippage, or the unmeshing of teeth (in cases of a toothed belt). Prevention of such slippage is especially important in the case of a chain driven camshaft in an internal combustion engine because jumping of teeth will throw off the camshaft timing by several degrees, possibly rendering the engine inoperative or causing damage. However, in the harsh environment in which an internal combustion engine operates, belt tension can vary between excessively high or low levels as a result of the wide variations in temperature and differences between the coefficients of linear expansion among the various parts of the engine, including the chain and the tensioner. Moreover, wear to the chain components, during prolonged use, can result in a decrease in the tension of the chain. Thus it is also necessary to provide some measures to remove excessive tensioning forces on the tight side of the chain and to insure the necessary tension forces on the slack side of the chain. In addition, cam shaft and crank shaft induced torsional vibrations cause belt tension to vary considerably. This tension variation results in chain elongation, determined by belt stiffness.

One example of a device used to control tension in a wrapped power transmission device is described in Kimura et al., U.S. Pat. No. 4,708,696. Kimura et al. discloses a hydraulic ball-type check valve tensioner having a plunger slidably fitted into a chamber and biased by a spring in a protruding direction. An extending rod imparts tension according to the degree of slackening of the chain. A clearance, formed between the ball and seat of a check valve, permits the free flow of fluid therethrough. Therefore, the hydraulic pressure from an external source, such as an oil pump or the like, flows into a chamber through passages formed in the housing, advancing the plunger easily by the combined efforts of the hydraulic pressure and the spring force.

On the other hand, when the plunger tends to move in a reverse direction, the ball is tightly contacted with the ball seat to restrict outflow of fluid from the chamber. Only a small clearance between the plunger and the housing wall permits some fluid to escape thereby allowing the plunger to retract. In such a fashion the tensioner achieves a so-called no-return function, i.e., movements are easy in one direction but difficult in the reverse direction.

However, the above-described tensioner construction fails to always maintain a predetermined tension, such as when an engine is idling or at rest with low or no oil pressure. Unless appropriate oil pressure is applied to the chamber or it is filled with sufficient oil, the plunger becomes easily movable in both directions and loses the no-return function, producing vibrations and noises due to the failure in maintaining a predetermined degree of tension in the chain. Moreover, the response time of a ball type check valve to open or close to or from a full flow condition is somewhat limited. Additionally, the use of a ball check valve requires the use of a complicated, costly structure which is difficult to assemble. In contrast, a spring check valve, such as that disclosed in Paul Jr. U.S. Pat. No. 3,896,834, offers several advantages. Specifically, such a check valve is of simple construction and features a more rapid response time than a ball type check valve to open or close to or from a full flow condition.

The provision of a ratchet, formed on the outer surface of the plunger, as disclosed in Suzuki U.S. Pat. No. 4,874,352, provides a mechanical no-return mechanism which ensures the plunger will remain extended outwardly even upon low oil pressure. Such a design, however, because it prevents the plunger from having a smooth cylindrical outer surface, causes problems with sealing the plunger cavity and maintaining pressure to the plunger.

Providing a ratchet internal to the plunger is therefore desirable. Renold Great Britain Patent 1,018,211 discloses a helical channel for use in such a tensioner. The helical channel engages with a cantilevered pin on the plunger. Because the pin is cantilevered however, it is susceptible to bending. In addition, because only one side of the internal ratchet is engaged with the plunger, the distribution of forces between the internal ratchet and plunger is asymmetrical, i.e. only one pin extending from one side of the interior wall of the plunger engages into the helical channel. Jamming of the internal ratchet in the plunger is therefore more likely.

Accordingly, it is an object of the present invention to provide a tensioner for chain, belt or similar wrapped power transmission devices which can maintain a substantially constant tensioning force.

It is another object of the present invention to provide a hydraulic tensioner which can provide a degree of tension to a chain or the like when the fluid pressure to the tensioner is low or zero.

It is a further object of the present invention to provide a hydraulic tensioner having an improved internal ratchet system to mechanically maintain the tension of a chain or the like.

It is also a further object of the present invention to provide a hydraulic tensioner which can be reliably sealed to thereby maintain fluid pressure in the tensioner.

It is also a further object of the present invention to provide a hydraulic tensioner which has a reliable design to ensure the internal ratchet and plunger operate smoothly and efficiently.

It is also a further object of the present invention to provide a hydraulic tensioner which has a check valve configured to offer a high frequency response and rapid opening or closing to or from a full flow condition.

SUMMARY OF THE INVENTION

According to one aspect of the present invention, there is provided a tensioner for a wrapped power transmission device, e.g. a chain linking at least two rotating members such as a pair of sprockets. A plunger, internally provided with a fluid chamber, slidably fits within a mounting cavity in a housing. A spring is provided to bias the plunger in a protruding direction towards the chain. A check valve having a variable orifice is provided between the housing and fluid chamber to permit fluid to flow into the fluid chamber of the plunger while blocking flow in the opposite direction. In the preferred embodiment a cylindrical spring check valve is used to provide a variable orifice. This spring check valve blocks outflows of fluid when a load is applied to the plunger by a chain, or other type of wrapped power transmission device, in a direction opposite to the biasing direction, thereby increasing the fluid pressure in the chamber. Because the inertia of the spring is very low, the disclosed check valve has a high frequency response. In addition, the configuration of the valve is such that the valve may be rapidly opened or closed to or from a full flow condition.

According to another aspect of the present invention, an internal ratchet is provided inside the plunger, specifically a cylinder having a double helix channel to engage the plunger through a pair of projections. In this fashion, the internal ratchet serves to limit the amount the plunger may be pushed back into the housing, i.e., a "no-return" function. This serves, therefore, to maintain constant tension to the chain. Specifically, the internal ratchet allows only limited stepwise retraction of the plunger. Even when no oil pressure exists, such as when an engine is started, the plunger is maintained in its protruded position by the operation of the ratchet. Thus, the internal ratchet serves to constantly maintain the tension of the chain. Because a double helical channel configuration is used, a single pin spanning between the plunger interior and engaging both channels may be used, i.e. a cantilevered pin is not necessary. In addition the double helical channel configuration also permits for a symmetrical distribution of forces between each channel. Accordingly the likelihood of jamming between the plunger and internal ratchet is decreased.

It is furthermore possible and preferred to employ, in combination, the above-mentioned spring check valve and the double helix internal ratchet with the no-return function.

For a better understanding of these and other objects and aspects of the invention, reference should be made to the following detailed description taken in conjunction with the accompanying drawings.

BRIEF DESCRIPTION OF THE DRAWINGS

FIG. 6 is an exploded perspective view of the hydraulic tensioner of the present invention illustrating the cylindrical spring check valve and the double helix internal ratchet.

FIG. 7 is a sectional view of the assembled hydraulic tensioner showing a cylindrical spring check valve and a double helix internal ratchet.

FIG. 8 is a fragmented plan view of the recess and hollows of a helical channel of the internal ratchet.

FIG. 9 is a sectional view of the housing of the tensioner of FIG. 7.

FIG. 10 is an exploded perspective view of an alternate embodiment of the hydraulic tensioner of the present invention showing a ball-type check valve and a double helix internal ratchet.

DETAILED DESCRIPTION OF THE DRAWINGS

Figure 5:
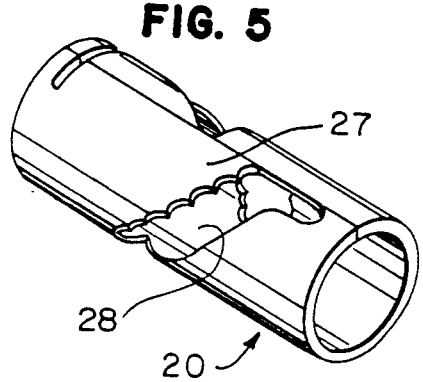
FIG. 5 is a perspective view of the double helix internal ratchet of the present invention after it has been rolled into its final cylindrical form.

Turning now to the drawings, FIG. 7 depicts a sectional view of the present invention. As seen, the present invention is constructed from a housing 24 having a mounting cavity 23 in which plunger 22 is mounted. Through a passage 50 in the bottom the mounting cavity 23, and thus plunger 22, communicates with a fluid reservoir chamber 51 in the housing 24. As shown in detail in FIG. 1, a check valve 1 disposed on the mounting cavity bottom permits fluid to flow into, but not out of, the mounting cavity 23. Plunger 22, as seen in FIG. 6, slidably fits within the mounting cavity 23. A spring 26, disposed within a bore 21 in the plunger 22, biases the plunger outwardly from the housing 24. The head 25 of the plunger 22 extends outward from the housing 24 and engages the chain to thereby provide tension. An internal ratchet 20 is fitted within the bore 21 of the plunger 22 to permit only incremental inward movement. The internal ratchet 20 has two helical channels 28, as shown in FIG. 5, into which a pin 29 mounted across the walls of the plunger 22 engage. One wall 40 of each of the channels is serrated to engage the pin 29 upon inward movement of the plunger 22. Through such engagement, the plunger 22 is permitted to move inwardly in only incremental steps. A discharge bore 33 at the head 25 of the plunger 22 permits fluid to exit from the internal bore 21 of the plunger 22 and the mounting cavity 23 when the plunger moves inwardly. Thus fluid, blocked from flowing back into the reservoir chamber 51 by the spring check valve 1, is vented to lubricate the area where the plunger head 25 contacts the chain.

Figure 1:
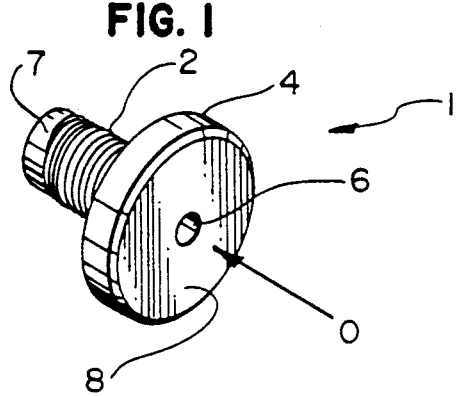
FIG. 1 is a perspective view of the cylindrical spring check valve of the tensioner of the present invention showing the inlet to the bottom retainer portion and showing the spring coils in the normally mutually contacting condition wherein the valve is closed.
Figure 2:
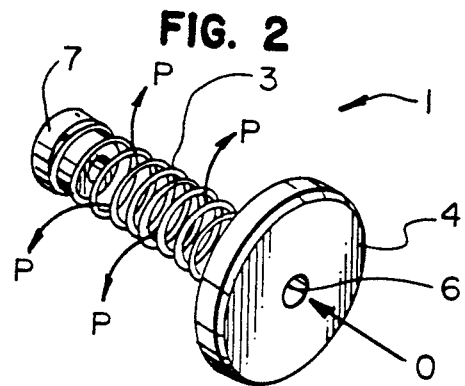
FIG. 2 is a perspective view of the cylindrical spring check valve portion of the present invention showing the spring coils in the expanded, non-contacting condition wherein the valve is opened.
Figure 3:
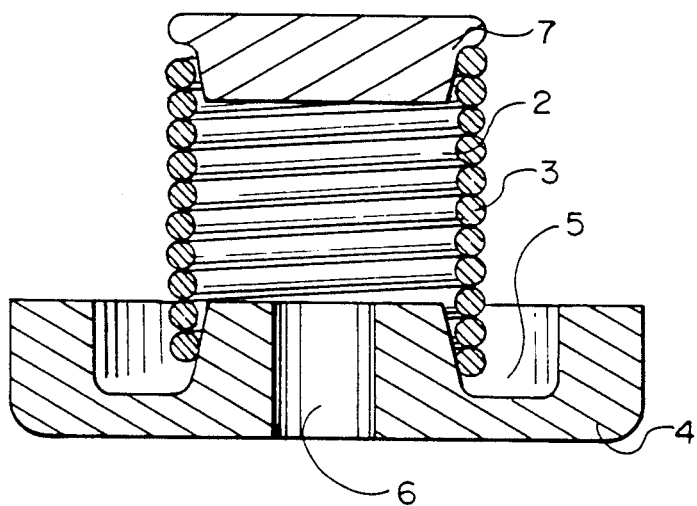
FIG. 3 is a sectional view of the cylindrical spring check valve depicted in FIG. 1.

FIGS. 1 through 3 detail the spring check valve assembly 1 used in the claimed invention. The preferred embodiment utilizes a cylindrical compression spring 2 in which the coils 3 are normally in a mutually contacting condition wherein no gap exists between the coils. Thus no fluid can flow between the coils when the valve is closed. Of course, other spring configurations may be used, such as one utilizing an expansion spring in which the coils of the spring are normally in a mutually non-contacting condition so that a gap normally exists between the coils or one utilizing a frusto-conical compression spring.

The spring check valve assembly 1 is constructed from a compression spring 2 having a bottom spring retainer 4 on its bottom and a top spring cap 7 on its top. The bottom spring retainer 4 has an orifice 6 through it which allows a fluid to flow from the volume proximate the bottom surface 8 of the bottom retainer 4 to the volume enclosed by the spring coils 3. Specifically, as best seen in FIG. 7, the orifice 6 corresponds to the oil passage 50 in the housing 24 when the spring check assembly 1 is positioned in the bottom of the mounting cavity 23. The top spring cap 7 is likewise used to seal the top end of the spring from fluid leakage. Thus, because of the normally mutually contacting position of the spring coils 3, fluid which flows through the orifice 6 into the volume bounded by the spring coils, depicted by line O in FIG. 1, is prevented from escaping. However, upon attaining sufficient pressure, fluid within the volume bonded by the spring coils 3 will force apart the coils, thereby allowing the fluid to flow through the coils as shown by lines P in FIG. 2.

Figure 4:
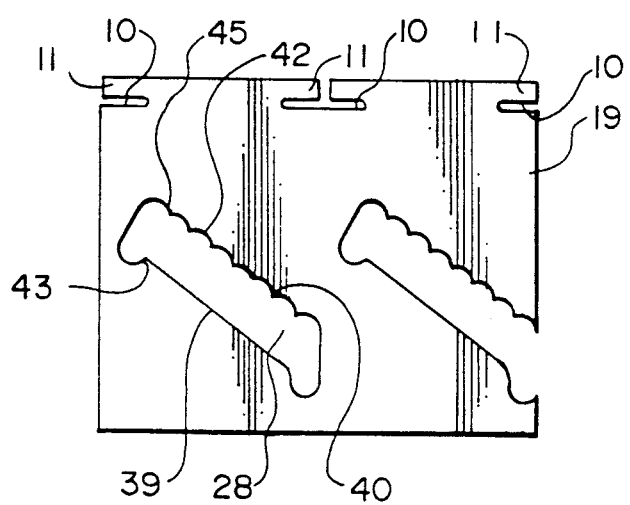
FIG. 4 is a plane view of the internal ratchet portion of the present invention before it is rolled into its final cylindrical form.

FIGS. 4 and 5 show the double helix internal ratchet 20 used in the claimed device. FIG. 6 is an exploded view of the claimed device showing the placement of the internal ratchet 20. The internal ratchet 20 is received in an internal bore 21 of plunger 22. Pin 29 slidably fixes the plunger 22 and internal ratchet 20 together. The internal ratchet 20 has crimping cutouts 10 which are used to define tabs 11. Tabs 11 on the internal ratchet 20 are folded inward to provided a surface of the internal ratchet 20 which is engaged by the spring 26, as seen in FIG. 7. Thus tabs 11 are used to dispose the spring 26 between the internal ratchet 20 and the plunger 22. The plunger 22, in turn, is received in the mounting cavity 23 of housing 24. The internal bore 21 of the plunger 22 is substantially closed at one end and the internal ratchet 20 abuts against the end so that the spring 26 tends to move the head 25 of the plunger 20 away from the housing 24 and towards the chain (not shown) thereby imparting tension to the chain.

The internal ratchet 20 is constructed from a plate 19 which is rolled into a cylinder 27 having two helical channels 28. Into each channel 28 projects pin 29, as seen in FIG. 6, which is fixed across the inside of the internal bore 21 of the plunger 22. Each helical channel 28 has two walls, a first or smooth wall 39 and a second or serrated wall 40.

In operation, as the chain slackens the pin 29 slides along each of the smooth walls 39 of each helical channel 28. The cylinder 27 is thus caused to rotate as the plunger 22 and cylinder 27 move relatively apart under the biasing action of the spring 26. If the plunger 22 is pressed back into the mounting cavity 23, for example by vibration of the chain, the pin 29 is moved towards each serrated wall 40 of each channel 28 and engages in each of the hollows 42 of each channel 28. Once a pin 29 has so engaged each hollow 42, further retraction of the cylinder 27 relative to the plunger 22 is prevented.

Thus the head 25 of the plunger 22 is biased outwardly from the housing 24 so as to take up any slack in the chain but limited to only incremental return movement. The specific amount of return movement allowed in each increment is governed by the width of the helical channels 28. The width of each channel 28 is selected to allow for likely tightening of the chain which may occur as a result of, for example, temperature changes.

To facilitate installation of the internal ratchet cylinder 27 and plunger 22 of the tensioner in position so that the head 25 bears against a chain to provide tension, it is necessary to have the cylinder 27 and plunger 22 locked together with the spring 26 compressed between them and the cylinder 27 projecting only a short distance beyond the open end of the mounting cavity 23. Once the tensioner has been fitted and secured into position through mounting holes 52 it then becomes necessary to release the cylinder 27 from the plunger 22 so that the spring 26 urges the head 25 of the plunger 22 beyond the open end of the mounting cavity 23 to thereby impart tension to the chain.

For this purpose there is provided a step 43 (depicted in FIG. 4 and shown in detail in FIG. 8 in the smooth wall 39 of each helical channel 28 near the end of the cylinder 27 remote from the head 25. To lock the cylinder 27 and plunger 22 together, the cylinder is pressed against the bias of spring 26, and rotated until the pin 29 engages, on slight release of the pressure, each step 43. The steps 43 prevent sliding movement of the pin 29 in the channels 28 under the action of spring 26 and thus lock the cylinder 27 and plunger 22 together.

On each serrated wall 40 there is near to the step 43 a hollow 42 in the serrations. This hollow 42 is displaced from a line through the step 43 parallel to the axis of the cylinder 27. The wall 45 of the hollow 42 nearest to the step 43 forms an inclined face leading into the hollow 42. If, when in the locked position, the cylinder 27 and the plunger 22 are pressed together pin 29 moves on the line A (depicted in FIG. 8) into abutment with the wall 45 and, on further pressure, slides along the wall 45 so that the cylinder 27 and plunger 22 are caused to rotate relatively until the pin 29 moves into each of the hollows 42 of each of the helical channels 28 in the position 46 shown dotted in FIG. 8. On subsequent release of the cylinder 27 and plunger 22 the pin 29 moves under the action of the spring 26 on the line C into abutment with the region 47 of each smooth wall 39. The pin 29 does not re-engage the steps and the cylinder 27 and plunger 22 are released so that the spring 26 is able to urge the head 25 against the chain.

FIG. 6 shows in perspective an exploded view of the preferred embodiment of the claimed hydraulic tensioner. The housing 24 has a mounting cavity 23 having a pressure bore 50, as best seen in FIG. 9, allowing oil under pressure from the reservoir chamber 51 to be introduced into the mounting cavity 23. The spring check valve assembly 1 is mounted in the bottom of the mounting cavity 23. Through this configuration, the pressure bore 50 is subject to the spring check valve assembly 1, thereby allowing only oil to flow from the reservoir chamber 51 into the mounting cavity 23 but not allowing a return flow outward. A biasing spring 26 is positioned, as best seen in FIG. 7, to engage in the inner recess 5 of the bottom spring cap 4. The internal ratchet 20 is positioned within the internal bore 21 of the plunger 22. The plunger 22 has a pin 29 mounted across and between the internal bore 21 to engage into the helical channels 28 of the internal ratchet 20. Thus, the plunger 22 and the internal ratchet 20 are slidably fixed together. Disposed within a second bore or discharge port 33 of the plunger 22 is a plug 34 having a helical groove 35 on its circumferential surface. Through this configuration, the plug 34 and the second bore or discharge port 33 form an orifice 36 bounded by the wall surface of the second bore 33 and the helical groove 35 of the plug 34. This allows for a small amount of fluid or oil from the internal bore 21 of the plunger 22 to be supplied to the outside of the head 25 of the plunger by the orifice 36 of the discharge port 33 so as to lubricate the chain (not shown). In addition, as best seen in FIG. 7, a lubricant bore 53 may also be provided in the housing 24 to provide for additional lubricant to be delivered to the chain (not shown). The lubricant bore 53 is connected to the resevoir chamber 51 through passageway 54.

The operation of the tensioner is as follows. If a slack condition occurs to the chain under driving conditions, the plunger 22 protrudes outwardly from the housing 24 due to the biasing action of the spring 26. The protrusion of the plunger 22 expands the volume of the internal bore 21 and the mounting cavity 23, thus the pressure of any fluid in this volume is lowered. This causes a pressure differential across the spring check valve assembly 1 causing the compression spring 2 to elongate, thereby supplying fluid to the internal bore 21 through the oil passage 50 in the housing 24. Thus, the pressure of the oil within the volume of the internal bore 21 and the mounting cavity 23 is increased, thereby assisting the spring 26 to maintain the plunger 22 to protrude out of the housing 24 and impart tension on the chain.

In the situation where the chain is excessively tensioned, a pressing load is imposed on the plunger 22 in a direction reversed to the biasing direction of the spring 26. At this time, the spring check valve assembly 1 acts to block the outflow of oil from the internal bore 21 and the mounting cavity 23, and the oil, which is a non-compressive fluid in the bore, prevents retraction of the plunger 22. Simultaneously, the internal ratchet 20, as described above, engages with the pin 29 on the plunger 22. Retraction of the plunger 22 is blocked stepwise by the meshing engagement of the pin 29 with the hollows 42 of each serrated wall 40 of the channels 28. Thus, the plunger 22 is further supported from retraction by not only the spring 26 and the pressure of oil within the internal bore 21 and mounting cavity 23, but also by the engagement of the pin 29 with the channels 28 of the internal ratchet 20. In this fashion, the plunger 22 is supported from retraction.

FIG. 10 shows a second embodiment of the claimed invention which utilizes a ball-type check valve rather than a cylindrical spring check valve. Other than this difference, all other features of this embodiment are the same. The ball type check valve assembly 60 is constructed from a ball seat 61 having an orifice 62. A belleville seal 67 is provided to seal the edges of the ball seat 61 in the mounting cavity 23. A ball 63 with a diameter larger than orifice 62 is seated on the top side 64 of the ball seat 61. A spring 65 is provided between a cage 66 and the ball 63 to bias the ball towards the orifice 62. In such a fashion, the ball 63, due to the bias of the spring 65, normally obstructs the orifice 62 so that fluid cannot flow through it, i.e., the ball-type check assembly provides the same function as the spring-type check assembly. Similarly the tensioner of this second embodiment operates in the same way as the spring-type check tensioner discussed above.

The above are two of the preferred embodiments of the present invention as contemplated. Various changes and modifications may be made by those skilled in the art without departing from the spirit of the invention.

What is claimed is:

1. A hydraulic tensioner for a wrapped power transmission device between rotating members comprising:
   a housing with a first fluid filled chamber and a second fluid filled chamber, said second chamber communicating with the atmosphere;
   a plunger positioned within said first chamber and capable of extending therefrom for bearing against a power transmission device to regulate the tension between rotating members;
   a spring biasing said plunger in a direction toward said device; and
   a variable orifice check valve having resilient means positioned to allow the transfer of fluid from said second chamber to said first chamber and to block fluid transfer from said first chamber to said second chamber, said valve permitting the transfer of fluid from said second chamber to said first chamber when said fluid in said second chamber through said resilient means achieves at least a first pressure.

2. The hydraulic tensioner of claim 1 wherein said resilient means further comprises a compression spring having its coils in a normally mutually contacting position, said spring coils configured to move to a mutually non-contacting position when said fluid in said second chamber achieves at least said first pressure.

3. The hydraulic tensioner of claim 2 wherein said spring is a cylinder.

4. The hydraulic tensioner of claim 2 wherein said spring is a tension spring.

5. A hydraulic tensioner for a wrapped power transmission device between rotating members comprising:
   a housing with a first fluid filled chamber and a second fluid filled chamber, said second chamber communicating with an external source of pressure;
   a plunger positioned within said first chamber and capable of extending therefrom for bearing against a power transmission device to regulate the tension between rotating members;
   a ratchet positioned within said plunger to prevent said plunger from moving inwardly upon contact with said device, said ratchet comprising a cylindrical body having two helical openings in said body, said openings communicating with said plunger so that said ratchet undergoes relative rotational movement when said plunger undergoes axial movement;
   a spring biasing said plunger in a direction toward said device; and
   a check valve having resilient means positioned to allow the transfer fluid from said second chamber to said first chamber and to block fluid transfer from said first chamber to said second chamber, said valve permitting the transfer of fluid from said second chamber to said first chamber when said fluid in said second chamber achieves at least a first pressure.

6. The hydraulic tensioner of claim 5 wherein each of said openings on said ratchet have a first wall and a second wall, said plunger has at least one projection, said projection engages at least one of said first walls of said openings when said plunger moves axially outward, and said projection engages at least one of said second walls of said openings when said plunger moves axially inward.

7. The hydraulic tensioner of claim 5 further comprising a recess in said first wall of each of said openings such that said projection can be engaged in said recess to prevent said plunger from moving axially outward and said projection can be disengaged from said recess by relative inward axial movement of said plunger against said action of said bias and an inclined face at a position opposite said recess, said inclined face being shaped and positioned for axial movement of said plunger to allow disengagement of said projection from said recess and sliding contact of said projection with said inclined face to permit relative rotation of said members sufficient to ensure said projection does not re-engage said recess when said members are released for relative movement under said action of said bias.

8. The hydraulic tensioner of claim 6 wherein said second wall of each of said helical channels has a greater resistance to said sliding movement of said projection than said first wall.

9. The hydraulic tensioner of claim 8 wherein said second wall is serrated.

10. A hydraulic tensioner for a wrapped power transmission device between rotating members comprising:
 a housing with a first fluid filled chamber and a second fluid filled chamber, said second chamber communicating with an external source of pressure;
 a plunger positioned within said first chamber and capable of extending therefrom for bearing against a power transmission device to regulate the tension between rotating members;
 a ratchet positioned within said plunger to prevent said plunger from moving inwardly upon contact with said device, said ratchet comprising a cylindrical body having two helical openings in said body, said openings communicating with said plunger so that said ratchet undergoes relative rotational movement when said plunger undergoes axial movement spring biasing said plunger in a direction toward said device; and
 a variable orifice check valve having resilient means positioned to allow the transfer of fluid from said second chamber to said first chamber and to block fluid transfer from said first chamber to said second chamber, said valve permitting the transfer of fluid from said second chamber to said first chamber when said fluid in said second chamber achieves at least a first pressure.

11. The hydraulic tensioner of claim 10 wherein said resilient means further comprises a compression spring having its coils in a normally mutually contacting position, said spring coils configured to move to a mutually non-contacting position when said fluid in said second chamber achieves at least said first pressure.

12. The hydraulic tensioner of claim 10 wherein said spring is a cylinder.

13. The hydraulic tensioner of claim 12 wherein said spring is a tension spring.

14. The hydraulic tensioner of claim 10 wherein each of said openings on said ratchet have a first wall and a second wall, said plunger has a projection, said projection engages at least one of said first walls of said openings when said plunger moves axially outward, and said projection engages at least one of said second walls of said openings when said plunger moves axially inward.

15. The hydraulic tensioner of claim 10 further comprising a recess in said first wall of each of said openings such that said projection can be engaged in said recess to prevent said plunger from moving axially outward and said projection can be disengaged from said recess by relative inward axial movement of said plunger against said action of said bias and an inclined face at a position opposite said recess, said inclined face being shaped and positioned for axial movement of said plunger to allow disengagement of said projection from said recess and sliding contact of said projection with said inclined face to permit relative rotation of said members sufficient to ensure said projection does not re-engage said recess when said members are released for relative movement under said action of said bias.

16. The hydraulic tensioner of claim 11 wherein said second wall of each of said helical channels has a greater resistance to said sliding movement of said projection than said first wall.

17. The hydraulic tensioner of claim 16 wherein said second wall is serrated.

* * * * *

UNITED STATES PATENT AND TRADEMARK OFFICE
CERTIFICATE OF CORRECTION

PATENT NO. : 5,259,820
DATED : November 9, 1993
INVENTOR(S) : Philip J. Mott

It is certified that error appears in the above-indentified patent and that said Letters Patent is hereby corrected as shown below:

In column 5, line 9, delete "bonded" and substitute --bounded--.

In column 5, line 20, delete "provided" and substitute --provide--.

In column 6, line 4, after "8" insert --)--.

In column 6, line 65, delete "resevoir" and substitute --reservoir--.

In column 8, line 4, after the second occurrence of "chamber" insert --through said resilient means--.

In column 8, lines 5-6, delete "through said resilient means".

Signed and Sealed this

Thirty-first Day of October 1995

Attest:

BRUCE LEHMAN

Attesting Officer     Commissioner of Patents and Trademarks